United States Patent
Hanson et al.

(10) Patent No.: US 12,553,216 B2
(45) Date of Patent: Feb. 17, 2026

(54) OBJECT DETECT MISUSE PREVENTION

(71) Applicant: Caterpillar Paving Products Inc., Brooklyn Park, MN (US)

(72) Inventors: Matthew Thomas Hanson, St. Louis Park, MN (US); Nathaniel Doy, Clayton, NC (US); John Lee Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 121 days.

(21) Appl. No.: 18/395,170

(22) Filed: Dec. 22, 2023

(65) Prior Publication Data

US 2025/0207365 A1 Jun. 26, 2025

(51) Int. Cl.
| | |
|---|---|
| *E02F 9/26* | (2006.01) |
| *E02F 9/20* | (2006.01) |
| *E02F 9/24* | (2006.01) |
| *G07C 5/02* | (2006.01) |

(52) U.S. Cl.
CPC .............. *E02F 9/26* (2013.01); *E02F 9/24* (2013.01); *G07C 5/02* (2013.01); *E02F 9/2033* (2013.01)

(58) Field of Classification Search
CPC .. E02F 9/26; E02F 9/24; E02F 9/2033; G07C 5/02
See application file for complete search history.

(56) References Cited

U.S. PATENT DOCUMENTS

| | | | |
|---|---|---|---|
| 5,642,093 A | 6/1997 | Kinoshita et al. | |
| 8,762,043 B2* | 6/2014 | Eidehall | B62D 15/0265 |
| | | | 701/302 |
| 9,855,945 B2 | 1/2018 | Fung et al. | |
| 11,537,144 B2* | 12/2022 | Minagawa | E02F 9/20 |
| 11,673,583 B2 | 6/2023 | Raichelgauz et al. | |
| 2013/0131907 A1 | 5/2013 | Green et al. | |
| 2020/0125114 A1* | 4/2020 | Minagawa | G05D 1/0282 |

* cited by examiner

Primary Examiner — Tyler J Lee (57) ABSTRACT

A system for preventing misuse of an object detection system of a work machine may include an output device and a controller communicatively coupled to the output device. The output device is configured to display a notification indicative of misuse of the object detection system. The controller includes a processing circuit comprising memory communicably coupled to one or more processors. The memory includes instructions thereon that, when executed by the one or more processors, cause the processing circuit to: detect a collision mitigation event of the work machine; classify the collision mitigation event as a misuse event; determine a misuse value associated with a work machine operation based on the misuse event; compare the misuse value with a misuse threshold; and, when the misuse value exceeds the misuse threshold, provide the notification indicative of misuse of the object detection system to the output device.

18 Claims, 6 Drawing Sheets

OBJECT DETECT MISUSE PREVENTION

TECHNICAL FIELD

The present application relates generally to work machines such as heavy equipment for construction, farm implements, and other machines adapted for performing work. More particularly, the present application relates to work machines having systems for detecting objects.

BACKGROUND

In the construction context, the surroundings of vehicles, and in particular work machines, may include unpredictable terrain and many types of varying objects/obstacles. While work machines may operate on roadways and/or on construction trails, the environment can also include undefined spaces surrounded or containing other equipment, trailers, construction materials, ground features including hills, holes, cliffs, mounds, piles, people, other vehicles, and/or other obstacles or objects. The varying terrain and the presence of obstacles have been addressed, in part, by the development of object detection systems for work machines and their environments. Sensor and control systems (e.g., object detection systems) may be equipped to a work machine, may detect the presence of an obstacle, hazard, or impending collision, and may implement collision mitigation events to alert the operator and/or prevent the collision. For example, object detection systems may sound an alarm of the work machine when approaching another vehicle or may automatically slow, stop, or prevent operation of the work machine or a component thereof to prevent the work machine from colliding with a detected obstacle/object.

However, while object detection systems mitigate accidental collisions by unaware or careless operators, these systems may encourage over-reliance on their safety/control features. For example, some operators may be tempted to let the object detection system brake, slow down, or change the route of the work machine rather than actively controlling the work machine to avoid the hazard/obstacle in the first place. In this way, an operator may see an object in a collision path of the work machine and continue to drive towards it, trusting that the object detection system will activate to avoid the obstacle for the operator. Such behavior may be classified as misuse of the object detection system and increase the likelihood of collisions (e.g., in events were the object detection system fails to detect an obstacle that the operator knowingly drives towards). This disclosure relates, in part, to solutions to prevent operator misuse of object detection systems and to encourage/train operators to actively operate their work machines to avoid obstacles while using the object detection systems as a safety measure rather than an "auto-pilot."

SUMMARY

A first aspect provided herein relates to a system for preventing misuse of an object detection system of a work machine. The system includes an output device and a controller communicatively coupled to the output device. The output device is configured to display a notification indicative of misuse of the object detection system. The controller includes a processing circuit comprising memory communicably coupled to one or more processors. The memory includes instructions thereon that, when executed by the one or more processors, causes the processing circuit to: detect a collision mitigation event of the work machine; classify the collision mitigation event as a misuse event; determine a misuse value associated with a work machine operation based on the misuse event; compare the misuse value with a misuse threshold; and, when the misuse value exceeds the misuse threshold, provide the notification indicative of misuse of the object detection system to the output device.

A second aspect provided herein relates to a method for preventing misuse of an object detection system of a work machine. The method may include the steps of: detecting, by one or more processors, a collision mitigation event of the work machine; classifying, by the one or more processors, the collision mitigation event as a misuse event; determining, by the one or more processors, a misuse value associated with a work machine operation based on the misuse event; comparing, by the one or more processors, the misuse value with a misuse threshold; and, when the misuse value exceeds the misuse threshold, providing, by the one or more processors, a notification indicative of misuse of the object detection system to an output device.

A third aspect provided herein relates to a work machine. The work machine includes an object detection system, an output device, and at least one processing circuit. The object detection system includes a sensor coupled to the work machine and a controller. The sensor is configured to detect an obstacle in a path of the work machine. The controller is configured to cause a collision mitigation event to avoid the obstacle. The output device is configured to display a notification indicative of misuse of the object detection system. The processing circuit includes at least one memory coupled to at least one processor. The memory has instructions stored therein that, when executed by the at least one processor, cause the at least one processor to: detect the collision mitigation event of the work machine, classify the collision mitigation event as a misuse event, determine a misuse value associated with a work machine operation based on the misuse event, compare the misuse value with a misuse threshold, and when the misuse value exceeds the misuse threshold, provide to the output device the notification indicative of misuse of the object detection system.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Example Work Machine

Figure 1:
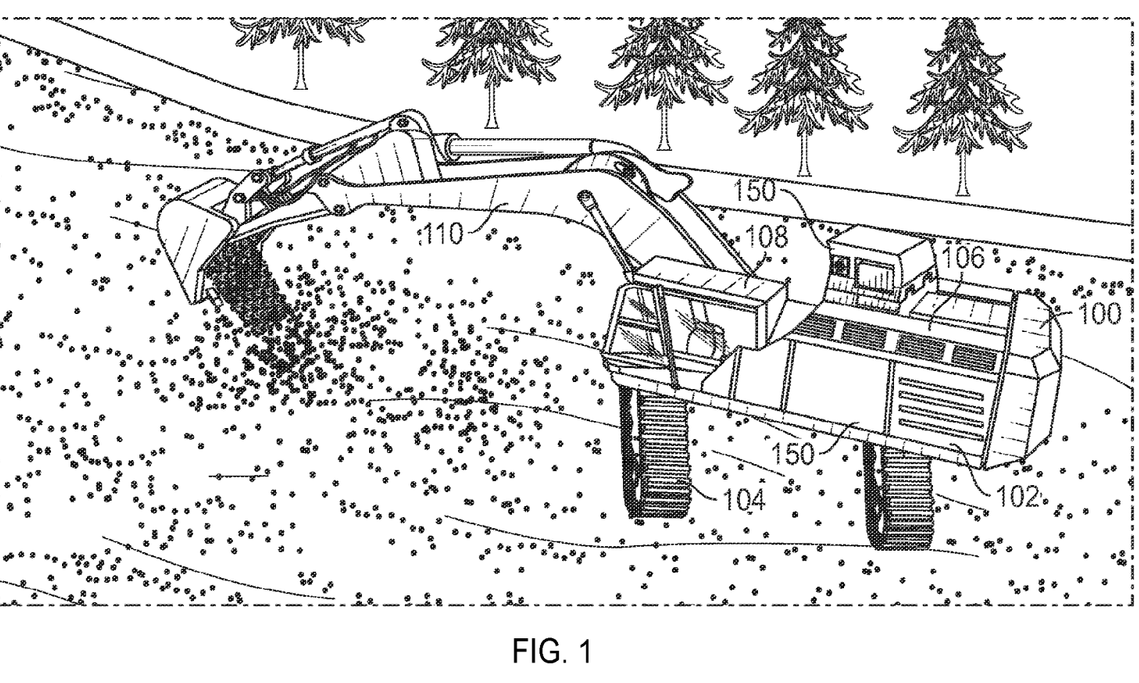
FIG. 1 is an example perspective view of a work machine equipped with an object detection system.

FIG. 1 shows an example work machine 100 equipped with one embodiment of an object detection system 150. The work machine 100 may be configured for performing work such as excavating, for example. The work machine 100 is illustrated as an excavator in FIG. 1 but can be any other work machine 100 such as a dozer, a compactor, mixer, scraper, motor grader, wheel loader, material hauler, and the like. The present disclosure is applicable to many machines, for example, a large off-highway truck, such as a dump truck, which are commonly used in mines, construction sites, and quarries. The work machine 100 may have a high payload capability and a travel speed of a few miles per hour when fully loaded. The work machine 100 may further be required to operate in a variety of environments, at a variety of altitudes, and to negotiate steep inclines in dry or wet conditions.

The work machine 100 may include a frame 102 and a power source 106 arranged on the frame 102, such as an electric motor, combustion engine, or other power source. The work machine 100 may also include a traction system 104 operably coupled to the power source 106 and configured to move the work machine 100 relative to the ground. The traction system 104 may include one or more tracks, wheels, skid feet, or other mobility mechanisms. In further embodiments, the work machine 100 may be an electric machine having an electric drive. The electric drive may provide the electric power to drive various components in the machine. In an embodiment, the electric power may be generated onboard by a generator, alternator, or another power-generation device, which may be driven by an engine or any other power source.

The work machine 100 may also include a control cab or station 108 and one or more implements 110 controllable from the control cab or station 108. In the present example, the implement 110 may include a series of hydraulically operated booms with a bucket, but as mentioned, the work machine 100 can take a variety of forms with respective implements adapted to perform respective types of work. An operator occupying the control cab 108 may control various functions of the work machine 100 by issuing various operator commands by means of controls such as a joystick, a lever, a touch-based user interface, a propel handle, a brake pedal, a steering wheel, an emergency brake, or the like.

Example Object Detection System

The object detection system 150 may be configured for detecting objects surrounding the work machine 100 and may be further configured for selectively issuing alerts and/or exercising machine controls depending on the type of objects detected and the locations of those objects. That is, for example, the work machine 100 may issue an alert when debris, equipment, or other inanimate objects are detected and may exercise machine controls when people or other animate objects are detected. Moreover, depending on the location of the inanimate objects or the animate objects, the object detection system 150 may issue alerts or actively manage controls/operation of the work machine 100. For example, the object detection system 150 may cause a siren, noise, or other auditory alert to issue in response to approaching within ten feet, twenty feet, thirty feet, etc. of an obstacle and/or may cause the work machine to automatically brake/stop moving in response to approaching within five feet, ten feet, twenty feet, etc. of an obstacle. In other embodiments, even if an object is detected, the machine may issue no alert (e.g., if the object is outside a pre-defined range from the path of travel of the work machine 100) or may issue an alert without a machine control.

Figure 2:
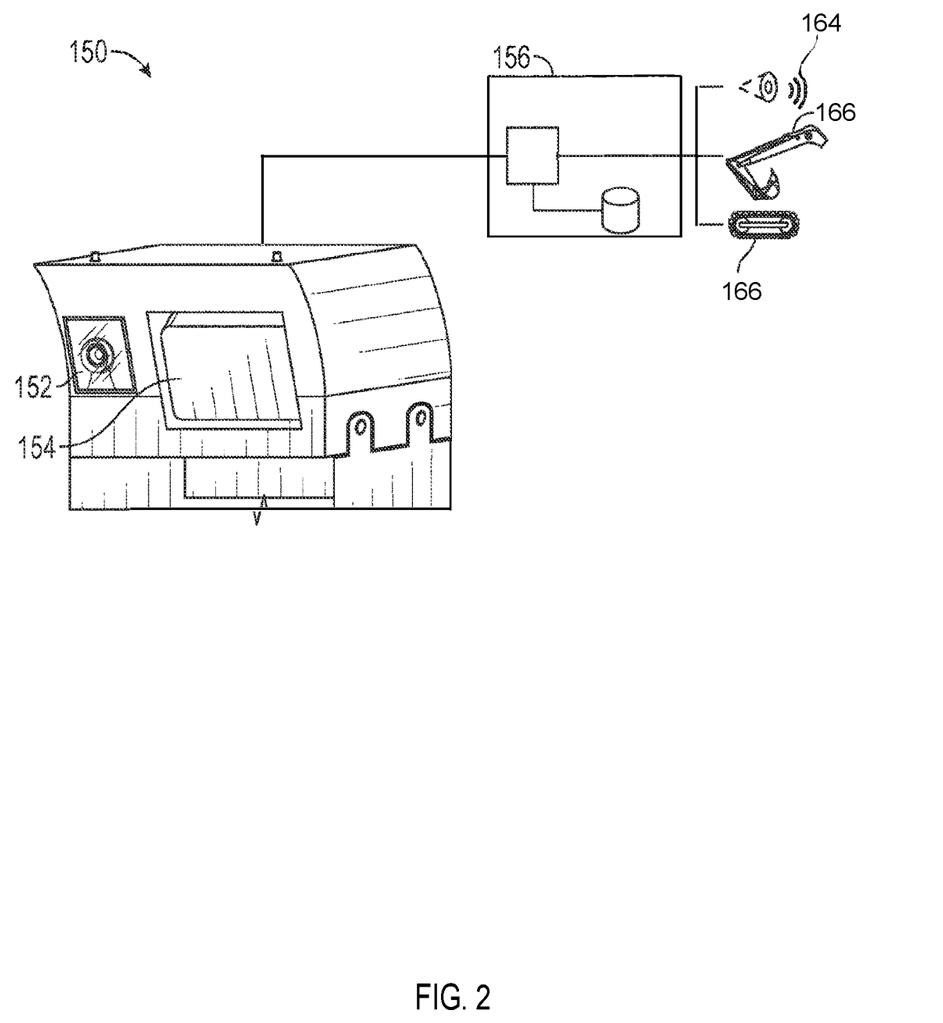
FIG. 2 is an illustration and schematic diagram of the example work machine and object detection system of FIG. 1.

As shown in FIG. 2, the object detection system 150 may include a first type of sensing device 152, which may be a camera or other image-based or photon sensing device, a second type of sensing device 154, which may be a radar, lidar, or ultrasonic radio frequency device, and a controller 156. The first type of sensing device 152 and the second type of sensing device 154 may be configured for sensing objects surrounding the work machine 100. One or more sensing devices 152 may be mounted on the work machine 100 and may be directed to capture an image stream of an area on a particular side of the work machine 100 and/or a particular region generally adjacent the work machine 100. Similarly, the second type of sensing device 154 may be configured to capture a data stream relating to an area adjacent the work machine. Like the first type of sensing device 152, the second type of sensing device 154 may be mounted on the work machine 100 and may be directed to sense objects on a particular side of the work machine 100 and/or a particular region adjacent the work machine 100. It should be understood that while the embodiment disclosed in FIG. 2 illustrates a first and second sensing device 152 and 154, a greater or fewer number of sensing device 152 and/or 154 (e.g., a third sensing device, a fourth sensing device, etc.) may be utilized depending on the desired configuration.

The first and second type of sensing device 152, 154 may be combined into a single sensing device and/or unit. For example, the object detection system 150 may include a housing attachable to a surface of the work machine 100 with a bracket. The housing may hold both the first-type sensing device 152 and the second-type sensing device 154. The housing may be adjustable relative to the work machine 100 and the devices 152, 154 may each be adjustable relative to the housing. The housing may be a relatively rigid housing made of metal or other relatively strong material to protect the devices 152, 154.

As discussed in more detail in U.S. Patent Publication No. US 2023/0393267 A1, which is hereby incorporated by reference in its entirety, the object detection system 150 may identify particular objects (e.g., animate or inanimate) at particular ranges from the work machine 100. While the ranges from the work machine 100 may be adjustable, in one or more examples, a first range may be an alert range where the object detection system 150 issues an alert but might not resort to controlling the work machine 100. In some embodiments, this range may be from approximately 2 to approximately 30 meters. A second range may be an alert/control range where the object detection system 150 may issue an alert and resort to controlling the work machine 100 to avoid contact with the identified object. Again, while adjustable, this range may be from approximately 0 to approximately 6 meters in some embodiments. Still other distances may be used for the inner and outer boundaries of these ranges and whether to issue an alert, a machine control, and/or both may also depend on the type of object and the confidence level of the sensing systems.

Figure 3:
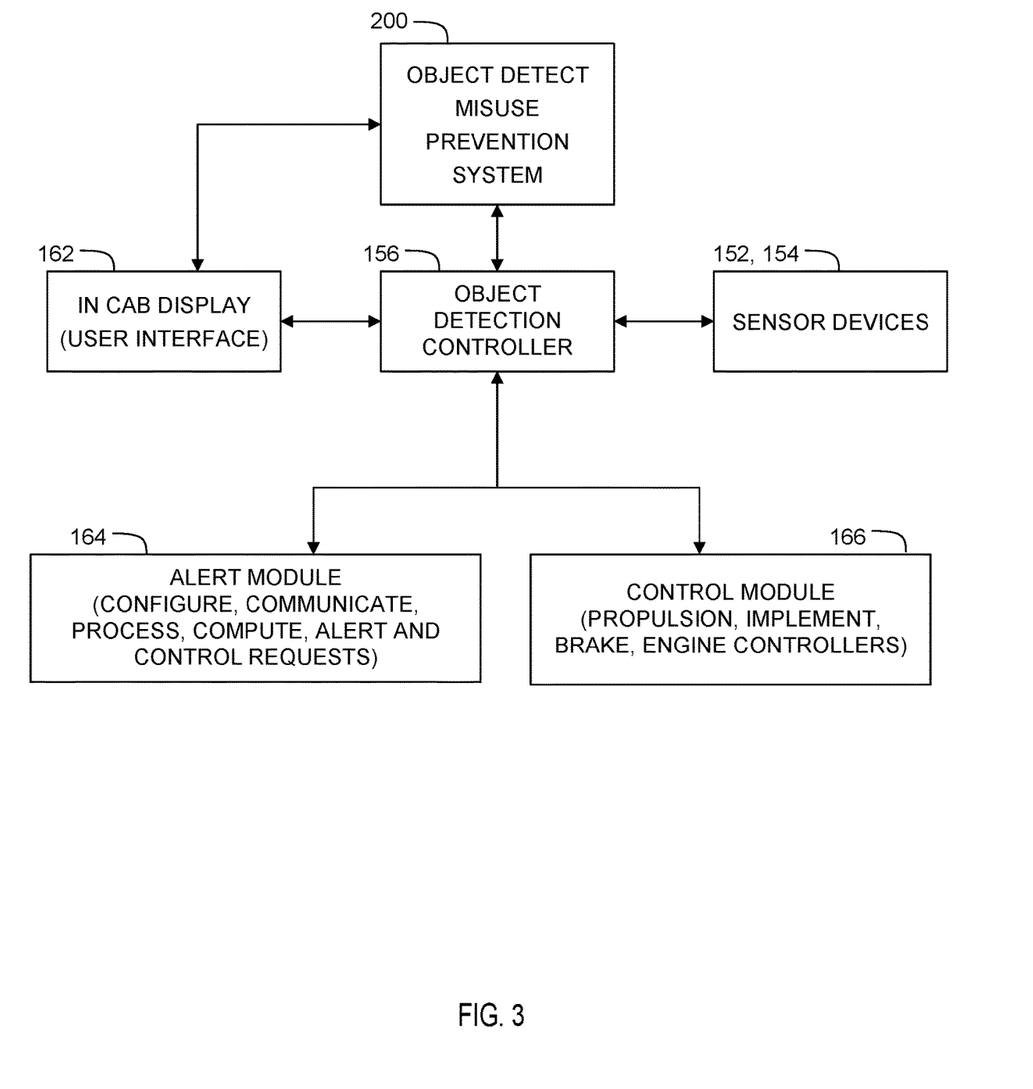
FIG. 3 is a block diagram illustrating an example configuration of an object detection system and an object detect misuse prevention system.

Referencing FIGS. 2-3, the object detection system 150 may include a controller 156 configured to operate the one or more first-type sensing devices 152 and the one or more second-type sensing devices 154 on the work machine 100. The controller 156 may also be configured to process the image stream, data stream, etc. received from the devices 152, 154 to determine if an object is present, where it is, and/or to categorize the object. The controller 156 may also be configured to determine if an alert should be issued or a machine control should be exercised and, accordingly, issue an alert and/or exercise a machine control adapted to avoid contact between the work machine 100 and the object. The controller 156 may include a computing device including a processor, a computer-readable storage medium, and one or more inputs and outputs. The computer-readable storage medium may include machine readable instructions for one or more algorithms to operate the one or more devices 152, 154, receive and process the data captured by them, and generate one or more outputs. The inputs may be particularly adapted to receive data from the one or more sensing devices 152, 154 and the outputs may be particularly adapted to issue alerts via an alert module 164 (e.g., sounds from a speaker, lights configured to flash or illuminate in a display, screens configured to display text, etc.) and/or may be particularly adapted to exercise machine controls via the control module 166 (e.g., cause an automatic brake action of traction system 104, cause power source 106 to produce less power and slow down work machine 100, etc.). The sounds or lights may be within the cab 108 of the work machine 100 to alert the operator, for example. Machine controls may generally include placing limitations on the operation of the work machine 100 and/or actively steering, braking, or controlling the implement of the work machine 100 in a particular way. The controller 156 may be part and parcel to the electronic control module (ECM) of the work machine 100 or a separate computing device may be provided.

In some embodiments, the object detection system 150 may further include an override functionality configured to allow an operator to ignore, turn off, temporarily mitigate, or otherwise bypass the alerts and/or control commands of the object detection system 150. For example, an input device (e.g., of the in-cab display/user interface 162) such as a button, dial, knob, lever, switch, or the like may cause an object detection override functionality. An override functionality may be defined as an operator manually overriding one or more features of the object detection system 150. For example, an operator may wish to maneuver the work machine 100 very close (e.g., less than one foot, less than two feet) to an object. The object detection system 150 may detect the object and cause an alert and/or stop the work machine (or an implement thereof) from moving closer than, for example, ten feet from the obstacle. Accordingly, in one embodiment, the operator may cause an override of the object detection system 150 by pressing a button in the cab 108 associated with the override functionality. A pre-defined time after the button is pressed or during the duration that the button is held down, the object detection system 150 may cease issuing machine control commands and allow the operator to maneuver the work machine 100 closer to the object (e.g., less than ten feet, less than 1 foot, etc.) without causing the work machine 100 to slow down, stop, or the like. The object detection system 150 may include additional override functionalities (e.g., temporarily powering down the object detection system 150, causing the object detection system 150 to stop sensing on one or more sides, setting the alarm to mute, etc.) and manners of triggering the override functionalities (e.g., typing a code or command to cause an override, removing a component to cause an override, etc.), all of which are contemplated and within the scope of this disclosure.

In embodiments including the override functionality of the object detection system 150, operators may be tempted to misuse the override functionality. For example, while some operators may misuse the object detection system 150 by over-relying on the control commands (e.g., holding down the throttle and driving directly towards an obstacle and relying on the object detection system 150 to halt the work machine 100), some operators may misuse the object detection system 150 by under-relying on its functionality. For example, an operator may tape down the override functionality button such that the object detection system 150 is always prevented from stopping, slowing down, or issuing control commands to the work machine 100.

Object Detect Misuse Prevention System

Figure 4:
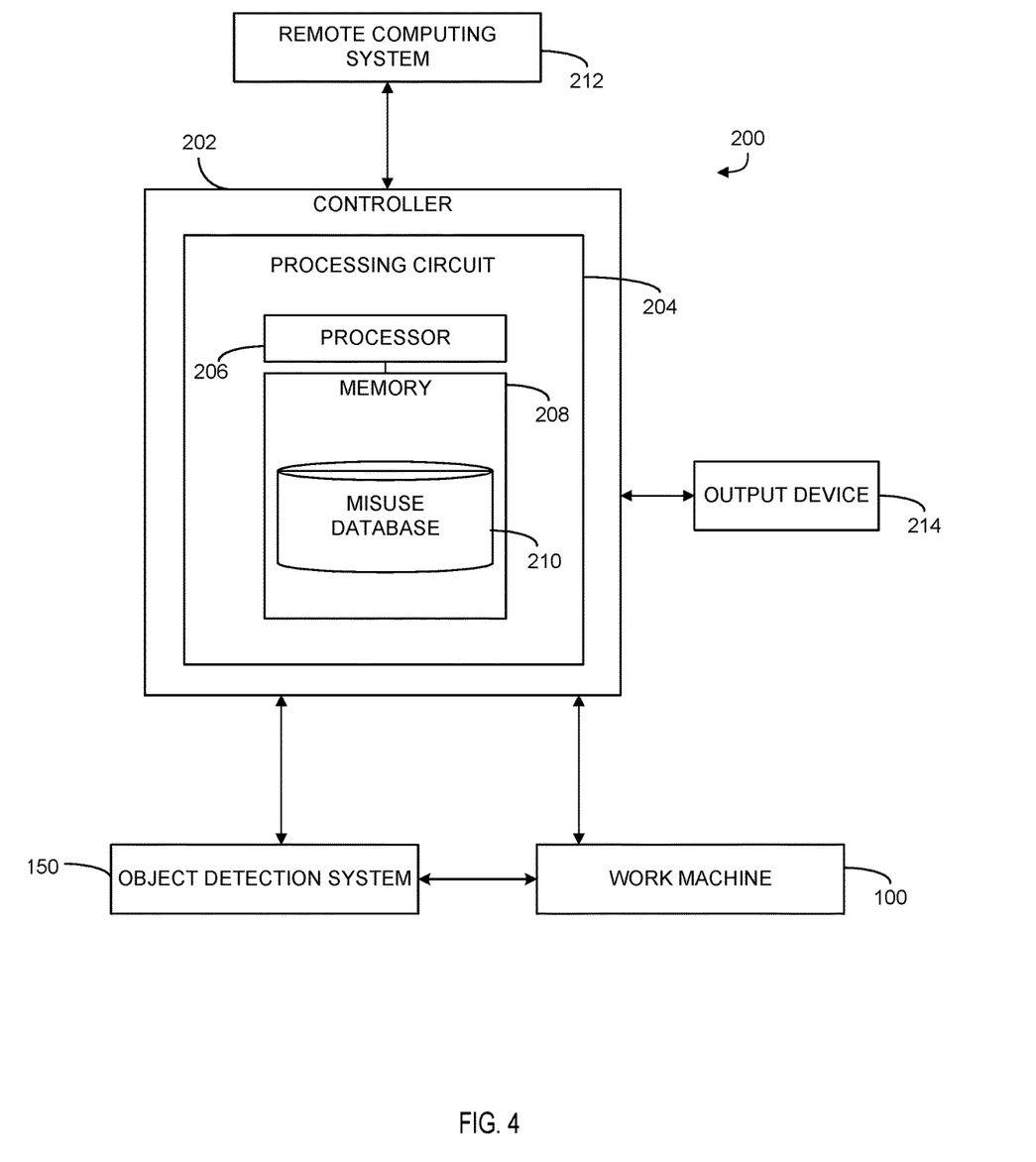
FIG. 4 is a block diagram illustrating an example configuration of an object detect misuse prevention system.

Referring to FIGS. 3 and 4, a system 200 for preventing misuse of an object detection system 150 of a work machine 100 is shown, according to one or more examples. The system 200 is configured to monitor the operation of a work machine 100 for events, activations, overrides, and the like associated with an object detection system 150 (e.g., a collision mitigation system) thereof. For example, the system 200 may monitor the work machine 100 and/or the object detection system 150 for collision mitigation events triggered, activated, or otherwise caused by the object detection system 150. As used herein, a "collision mitigation event" may include any machine controls and/or alarms caused by the object detection system 150 responsive to detecting an object/obstacle. For example, the collision mitigation event may include automatically stopping the work machine 100 or a component thereof, activating an automatic braking system of the work machine 100, activating an automatic object avoidance system of the work machine 100, activating an automatic motion inhibiting system of the work machine 100, altering a path of the work machine 100, preventing a movement of the work machine 100, derating the work machine 100, sounding one or more alarms associated with detecting an object, and the like. The system 200 may also monitor the work machine 100 and/or the object detection system 150 for object detection override events. As used herein, an "object detection override event" may include any use of the override functionality associated with the object detection system 150 (e.g., any operation allowing an operator to ignore, turn off, temporarily mitigate, or otherwise bypass the alerts and/or control commands of the object detection system 150). For example, the object detection override event may include pressing a button/switch/lever/etc. to activate the override functionality, powering off or disabling the object detection system 150, muting/silencing/obscuring an alarm or notification associated with the object detection system 150, activating the override functionality for an excessive period of time (e.g., placing tape over the override functionality button to keep the button constantly pressed down), activating the override functionality an excessive number of times within a designated period of time (e.g., thirty activations within one minute, one activation every ten seconds for a time period of two minutes, etc.).

In this way, the system 200 may collect data associated with use and/or misuse of the object detection system 150. For example, the system 200 may detect and collect data regarding one or more collision mitigation events and/or object detection override events of a specific work machine 100 or associated with a specific operator. The system 200 may further be configured to utilize the data to determine whether each event is a misuse event or an appropriate use of the object detection system 150, as discussed herein. By monitoring use of the object detection system 150 and classifying or otherwise detecting misuse events, the system 200 may collect misuse data regarding work machine 100 operations, inform operators to cease misusing the systems thereof, compile statistics across a fleet of work machines 100 or across a worksite regarding cumulative/average work machine operations, assist in developing training platforms and protocols for operators of work machines by comparing operator performance to that of their peers or an average misuse score, determining whether worksite accidents/collisions/damage results more frequently from operators having a high misuse score, among other benefits.

As shown in FIG. 4, the system 200 may include a controller 202 and at least one output device 214 configured to display a notification indicative of misuse of an object detection system 150 of a work machine 100. The controller 202 includes a processing circuit 204 having one or more processors 206 and at least one memory 208. In some embodiments, the memory 208 may include a misuse database 210 configured to store information associated with operation of the object detection system 150 of the work machine 100 and whether the operation of the work machine 100 includes misuse events, a misuse score associated with the operation, a misuse value indicative of an overall operator performance, etc. In some embodiments, the controller 202 may be communicatively coupled to one or more of the work machine 100, the object detection system 150, a remote computing system 212, and/or the output device 214.

The controller 202 may be a combination of, but not limited to, a set of instructions stored on a computer memory 208, one or more processors 206 configured to execute the set of instructions, a Random Access Memory (RAM), a Read Only Memory (ROM), flash memory, a data structure, and the like. The controller 202 may also share components with, be the same as, communicate with, or otherwise be interoperable with the object detection controller 156 of the object detection system 150, an engine control unit (ECU) of the work machine 100, and/or one or more components of the remote computing system 212. In this way and in some embodiments, the system 200 may offload some of the more computationally intensive features to the remote computing system 212 while performing other features and collecting misuse data from the work machine 100 and/or the object detection system 150.

The system 200 (e.g., via the one or more processors 206) is configured to detect a collision mitigation event and/or an object detection override event of the work machine 100. The system 200 may detect the collision mitigation event and/or the object detection override event by receiving one or more signals indicative of the respective event from the object detection system 150 and/or the work machine 100. In some embodiments, the system 200 may include one or more sensors configured to detect activation of an autobrake system of the work machine 100 (e.g., voltage or electrical sensors configured to detect activation/power of the object detection system 150 or a component thereof), to detect movements of the work machine inconsistent with the position of the steering wheel, propel handle, or other components (e.g., position sensors/inclinometers positioned on the steering wheel and/or propel handle and motion/velocity sensors positioned on the work machine 100 configured to detect a mismatch between the position of the operator controls and the movement of the work machine 100), and/or to detect activation of an override functionality (e.g., pressure sensors configured to detect a button press associated with an override functionality). In other embodiments, the system 200 may detect a collision mitigation event and/or an object detection override event based on communication with the remote computing system 212 (e.g., the object detection system 150 may communicate to the remote computing system 212 during a collision mitigation event, and the remote computing system 212 may send a corresponding alert to the system 200).

The system 200 is also configured to classify the collision mitigation event and/or the object detection override event as a misuse event. As used herein, a "misuse event" may be defined as any over-reliance, under-reliance, or otherwise improper circumvention of the object detection system 150. For example, over-reliance misuse events may include relying on the collision mitigation system to stop the machine, intentionally driving as if no collision event were present, holding down the throttle and driving directly towards an object such that the object detection system 150 stops the work machine 100 or avoids the object, failing to steer the machine to avoid an obstacle and instead relying on the auto-swerve/course correction features of the object detection system 150 to prevent a crash, or otherwise actively failing to avoid hazards and instead trusting that the object detection system 150 will autonomously/semi-autonomously prevent the otherwise avoidable collision/accident. Examples of under-reliance misuse events include holding down the override functionality for an excessive period of time, taping down the override functionality, silencing an alarm associated with the object detection system, and the like. Other misuse events include removing and/or disabling components of the object detection system 150 and the like. Such events may be categorized as object detection override events because removing or disabling components of the object detection system 150 may improperly turn off, temporarily mitigate, or otherwise bypass the functionalities of the object detection system 150.

Accordingly, the system 200 may classify a collision mitigation event as a misuse event based on the parameters, operating conditions, and control commands of the work machine occurring prior to, during, and after the collision mitigation event. For example, the system 200 may receive information/signals indicative of a work machine speed (or velocity) during the collision mitigation event, a work machine direction of travel during the collision mitigation event, an orientation of the work machine (e.g., facing north, facing south, facing opposite the travel direction, etc.), a seat direction during the collision mitigation event (e.g., operator facing away from the obstacle, operator seat facing directly towards the obstacle, etc.), a propel handle position, a brake pedal position, a position of a steering wheel, a transmission gear, an emergency brake use, a ramp rate of a joystick (e.g., how quickly the operator moved the joystick), and other machine information indicative of whether the operator actively allowed the collision mitigation event to occur or attempted to react to prevent the collision mitigation event. Similarly, the system 200 may classify the object detection override event as a misuse event based on like information or based on a duration of the object detection override event or a frequency of the object detection override event (e.g., determining misuse if the override functionality is triggered immediately upon startup of the machine, is held down for more than 10 minutes, etc.).

For example, the system 200 may detect that an operator chair was facing north, the work machine was traveling north, the throttle was at full speed, and no steering occurred leading up to or during a collision mitigation event which resulted in the object detection system 150 autobraking the work machine to avoid a collision with an obstacle to the north. The system 200 may classify the collision mitigation event as a misuse event based on the parameters and machine information collected proximate to the collision mitigation event. Specifically, the information is indicative of misuse (e.g., intentionally relying on the object detection system 150 without attempting to avoid the obstacle) because the operator chair was facing the obstacle indicating the obstacle was within the operator's line of sight, the throttle was full speed and directed towards the obstacle, and the operator made no attempt to steer to avoid the obstacle. In contrast, the system 200 may detect that a throttle position was north, an implement control was positioned to move the implement to the east, the operator rapidly adjusted the throttle to the south and derated the speed to an implement within five seconds of a collision mitigation event which occurred to prevent further movement of the implement. The system 200 may classify the event as a "normal event" (e.g., not a misuse event) because the parameters and machine information indicate the operator attempted to avoid the collision by changing the machine direction and slowing down the implement prior to the collision mitigation event.

In some embodiments, upon classifying an event as a misuse event, the system 200 may be configured to assign a misuse score to the misuse event based on the data from the work machine 100 or the object detection system 150. The misuse score may include applying a weighted modifier to the misuse event, determining a severity indicator associated with the misuse event, or the like. In this way, applying a misuse score may allow the system 200 to designate a first misuse event as more severe than a second misuse event. The misuse score may be based on an operator propel command (e.g., a propel handle position, an acceleration pedal position, a deceleration pedal position, or a transmission gear), a number of the collision mitigation events occurring within a time period of the misuse event, the time period of the work machine operation, the object detect override status, the machine speed, the machine direction, and/or the seat direction. For example, a misuse score may be calibrated on a scale of 1-10, may be assigned a modifier such as "low, moderate, high, severe, etc.", may result in the misuse event counting twice or having a greater effect on the operator's driving record, etc. In some embodiments, higher misuse scores may be associated with misuse events that include more parameters indicating intentional reliance on the object detection system 150 (e.g., full throttle, no steering, auto-brake triggered may result in a misuse score of "high" because both parameters show no attempt to avoid the obstacle; full throttle, sudden swerve of the steering wheel to the right, auto-brake triggered may result in a misuse score of "low" because the sudden swerve indicates an unintentional use of the object detection system 150, etc.).

The system 200 is further configured to determine a misuse value associated with a work machine operation based on one or more misuse events associated with an operator. For example, the misuse value may be indicative of an operator's cumulative performance on a given day, over a defined time period, at a given worksite, using a specific work machine, or the like. Accordingly, the misuse value may be determined and/or based on one or more misuse events and/or one or more misuse scores. For example, the misuse value may include a total number of the misuse events for a given operator (e.g., 30 misuse events, 25 misuse events at Worksite A, etc.), a number of the misuse events over a time period of the work machine operation (e.g., 40 misuse events in January 5 misuse events per week, etc.), an average rate of the misuse events per hour for an operator (e.g., 6 misuse events (ME) per hour), a ratio of the misuse events to a total number of the collision mitigation events (e.g., 1 misuse event per every two collision mitigation events, a 1:3 misuse to collision event ratio, etc.), a ratio of misuse events to normal events (e.g., 1 misuse event for every 5 normal events, etc.), or the like.

The system 200 may further be configured to compare the misuse value with a misuse threshold. The misuse threshold may be indicative of an unacceptable level of object detection system misuse, a higher-than-average misuse rate as compared to other operator misuse rates, or another suitable metric to gauge operator performance. For example, the misuse threshold may include a predetermined total number of the misuse events, a predetermined number of the misuse events over the time period of the work machine operation, a predetermined average rate of the misuse events per hour, or a predetermined ratio of the misuse events to the total number of the collision mitigation events.

The system 200 may further be configured to detect when the misuse value exceeds the misuse threshold. For example, the misuse threshold may be pre-set to an average rate of 3 misuse events per hour, a ratio of misuse events to collision mitigation events of 1:3, a maximum of 10 misuse events in a week, or the like. The system 200 may compare the misuse value of an operator or work machine 100 and determine that the misuse value exceeds the misuse threshold (e.g., an operator is performing at an average of 5 misuse events per hour, has a ratio of misuse events to collision mitigation events of 1:1, has reached his 11th misuse event in a 5-day window, etc.). After determining that the misuse value exceeds the misuse threshold, the system 200 may be configured to provide a notification indicative of misuse of the object detection system to the output device 214.

The output device 214 may be configured to display a notification indicative of misuse of the object detection system 150 and/or the work machine 100. For example, the output device 214 may receive one or more signals from the controller 202 and/or the system 200 responsive to a misuse value exceeding a misuse threshold. The output device 214 may include a work machine component (e.g., an in-cab display, a speaker, an alarm, a light, a beacon, a wearable worn by the operator, etc.), a mobile device (e.g., a tablet, a phone, a laptop, a computer, etc. associated with the operator, the work machine, another operator, a supervisor of the operator, or the like), or the remote computing system 212. The notification indicative of misuse may include, for example an audio, visual, tactile, or other alert to an operator of the work machine (e.g., a banner of text appearing on a display of the work machine 100 instructing the operator to actively avoid hazards). The notification may include an alert to an observer of the work machine (e.g., a flashing light on the exterior of the work machine 100 to alert other operators that the flashing work machine may be a hazard to operate near). The notification may also include an alert to a supervisor of the operator, or a signal sent to a database to log, track, or otherwise store information related to the misuse value. The system 200 may send additional alerts and/or combinations of the notifications discussed herein as appropriate. Further, the notifications, misuse values associated with one or more operators/work machines 100, misuse scores, algorithms/heuristics/models for calculating misuse scores, criteria/lookup tables/heuristics for classifying misuse events may be stored or otherwise logged in the misuse database 210 of the system 200.

In some embodiments, the controller 202 optionally may be configured to communicate with one or more remote computing systems 212 to receive a speed of the work machine 100, a throttle position, a steering wheel position, an orientation of the work machine 100, and/or other parameters, conditions, and information to determine whether a collision mitigation event is a misuse event. The remote computing system 212 may include, but not be limited to, remote or local databases or servers, other vehicles, processors, memory, and/or local or remote sensors. For example, the controller 202 may receive a signal corresponding to the speed of the work machine 100, the elevation at which the work machine is operating, the time of day, information regarding the planned route of the vehicle, and so forth.

Various operations described herein can be implemented on computer systems. FIG. 4 shows a block diagram of a representative object detect misuse prevention system 200 comprising one or more processors 206 and a computer memory 208 usable to implement the present disclosure. The object detect misuse prevention system 200 may include a computing system that can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. In some embodiments, the controller 202 is the computing system. In other embodiments, the computing system is a portion or subsystem of the object detect misuse prevention system 200. In some embodiments, the computing system may include conventional computer components such as one or more processors 206, storage device or computer memory 208, a network interface, a user input device, and a user output device 214.

A network interface coupled to or otherwise in communication with the computer system can provide a connection to a wide area network (e.g., the Internet) to which WAN interface of a remote server system can also be connected. Network interface can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

A user input device can include any device (or devices) via which a user can provide signals to the computing system; computing system can interpret the signals as indicative of particular user requests or information. The user input device can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

A user output device (e.g., output device 214) can include any device via which computing system can provide information to a user. For example, output device 214 can include display to display images generated by or delivered to a computing system (e.g., controller 202). The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Other output devices 214 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor can provide various functionality for the computing system, including any of the functionality described herein as being performed by a server or client, or other functionality associated with message management services.

It will be appreciated that the description of the computing system provided herein is illustrative and that variations and modifications to the configuration or implementation of the computer system are possible. Computer systems used in connection with the present disclosure can have other capabilities not specifically described here. Further, while the computing system is described with reference to particular blocks, it is to be understood that these blocks are defined for convenience of description and are not intended to imply a particular physical arrangement of component parts. For instance, different blocks can be located in the same facility, in the same server rack, on the same motherboard, or on the same circuitry. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

INDUSTRIAL APPLICABILITY

Figure 5:
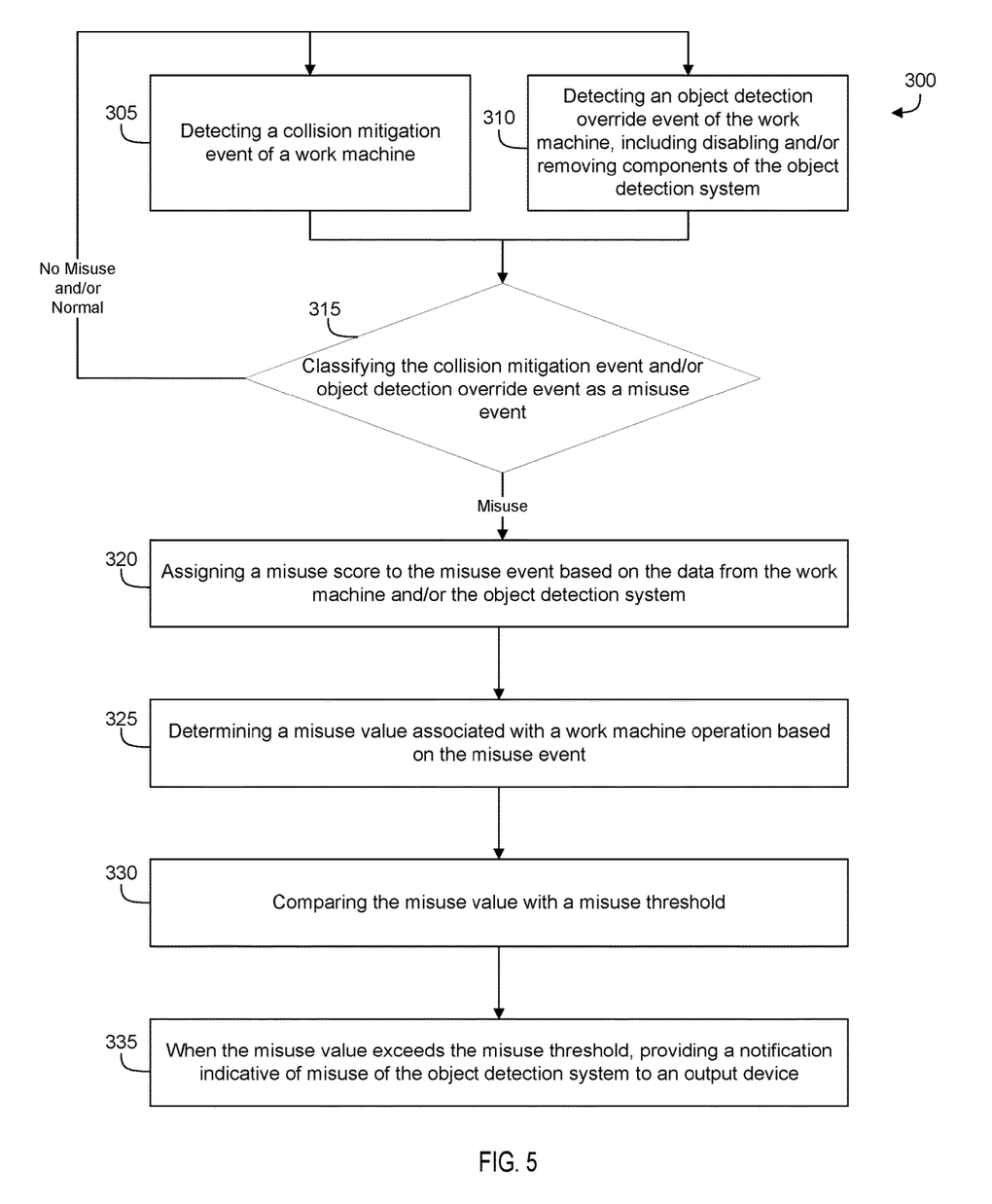
FIG. 5 is a flowchart of an example method of preventing misuse of an object detection system.
Figure 6:
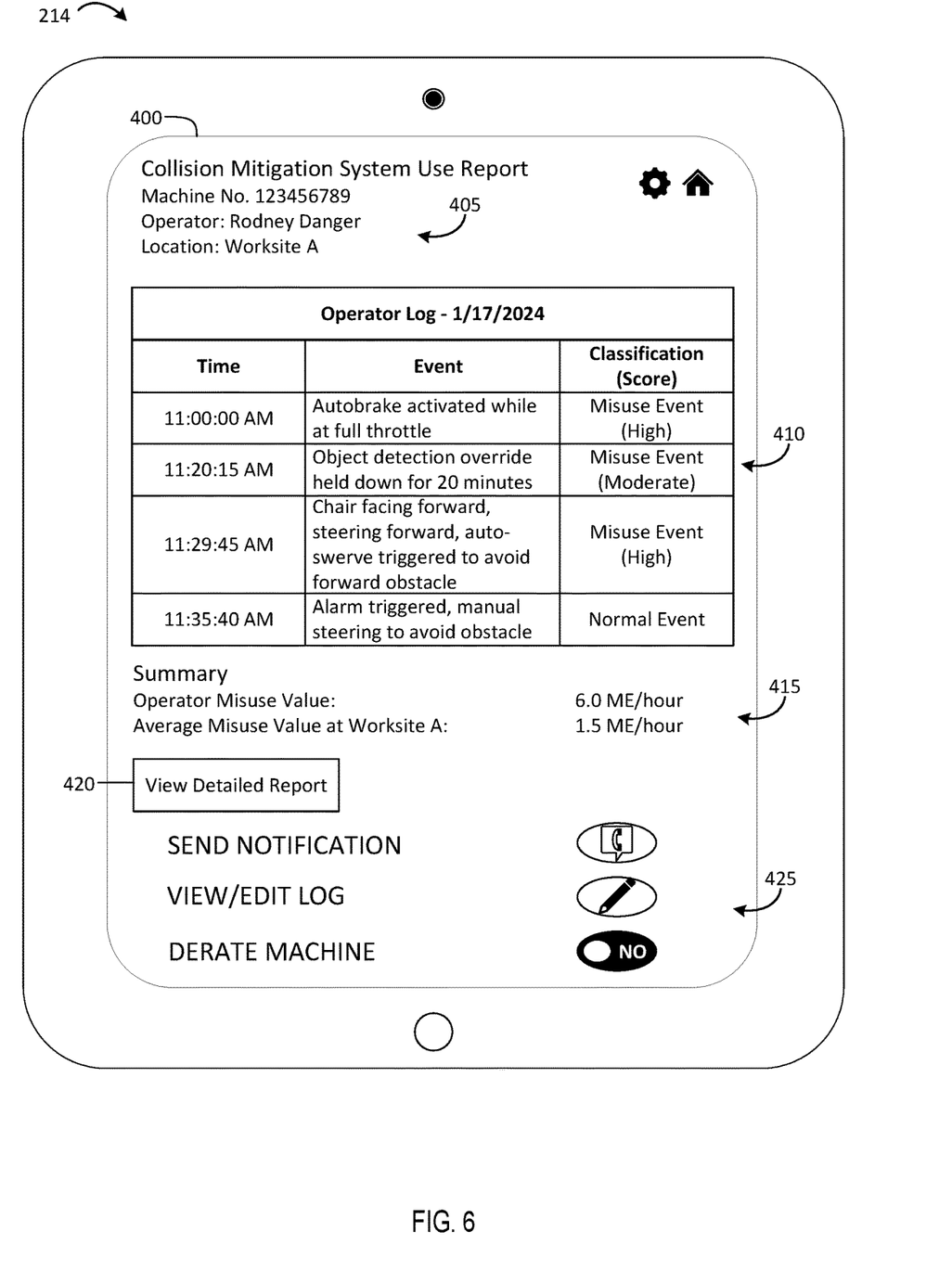
FIG. 6 is an example user interface of an output device of an object detect misuse prevention system, the example interface including illustrative notifications indicative of misuse of an object detection system.

In operation and use, the object detect misuse prevention system 200 may perform a method 300 of preventing misuse of an object detection system of a work machine shown in FIG. 5 and may generate comprehensive data that may beneficially be used to evaluate an operator's performance, to generate training platforms directed to preventing misuse of work machine safety systems, to send notifications to the operator to cease hazardous behavior, and/or to de-rate or issue commands to the work machine 100 of an operator to prevent hazardous worksite conditions or injury. For example, FIG. 6 illustrates an example graphical user interface (GUI) 400 of the system 200 provided to a user device 214. The data associated with the GUI 400 may be sent to the remote computing system 212 and may be accessible by a supervisor, company, or the like to compare misuse values across a fleet of operators. As shown in FIG. 6, the exemplary GUI 400 illustrates results of the method 300 for a single example operator.

As shown, the process may include step 305, detecting a collision mitigation event of the work machine 100. As discussed above, the system 200 may receive signals from the work machine 100, the object detection system 150, and/or sensors configured to detect the operating parameters of the work machine 100. The signals may contain data indicative of a collision mitigation event such as activations of the object detection system 150. In embodiments where the object detection system 150 of the work machine 100 includes an override functionality, the process may include step 310, detecting an object detection override event of the work machine 100, for example, by detecting a press of the override button of the object detection system 150.

Once the system 200 detects a collision mitigation event and/or an object detection override event, the system 200 may classify the collision mitigation event and/or the object detection override event as a misuse event (or, in some embodiments, a normal event). For example, an object detection system 150 may cause an autobrake function of a work machine 100 and communicate a signal indicative of the collision mitigation event to the system 200. At step 315, the method 300 may include determining whether the collision mitigation event (e.g., the autobrake function) is a misuse event or a normal event based on data from the work machine or the object detection system including at least one of an operator propel command, a number of the collision mitigation events, a time period of the work machine operation, an object detect override status, a machine speed, a machine direction, or a seat direction. In a particular embodiment, the system 200 may determine that the throttle was at full power, the steering wheel was directed towards the obstacle, an obstacle alert alarm had been flashing for 10 seconds, and no emergency brake was activated before and leading up to the autobrake function. Accordingly, at this step, the process may conclude that the autobrake function was a misuse event based on the operational conditions indicating the operator intentionally relied on the object detection system 150 to stop the work machine 100 without attempting to otherwise mitigate the collision.

Upon determining that the collision mitigation event and/or an object detection override event is a normal event (e.g., is not a misuse event), the process may conclude and the system 200 may return to monitoring for subsequent collision mitigation events and/or object detection override events. Additionally, the system 200 may log, store, or otherwise track the normal event and credit the event to the particular work machine 100 and/or to the operator of the work machine 100. For example, a determination that a collision mitigation event was not a misuse event may be logged on an account, file, operation history, performance chart, in misuse database 210, etc. associated with that operator. Accordingly, a dataset associated with the operator may reflect that the operator made appropriate use of the object detection system 150 (e.g., did not misuse the object detection system 150).

Upon determining that the collision mitigation event and/or the object detection override event is a misuse event, the process may include step 320 of assigning a misuse score to the misuse event. The misuse score may be based on data received from the work machine 100 and/or the object detection system 150. The data may include the conditions, parameters, control settings, and the like of the work machine 100 within a pre-determined time period of the detected misuses event. For example, the data may include the throttle position, steering patterns, brake use, seat direction, object detection override status, etc. of the work machine 10 seconds before the misuse event, up to 10 seconds after the misuse event, at the point the collision mitigation event occurred, at the start of the activation of the override functionality, etc. The misuse score may include applying a weighted modifier to the misuse event, determining a severity indicator associated with the misuse event, or the like.

The method 300 may also include step 325, determining a misuse value associated with a work machine operation based on the misuse event. As discussed above, the misuse value may be defined as a total number of the misuse events, a number of the misuse events over a time period of the work machine operation, an average rate of the misuse events per hour, or a ratio of the misuse events to a total number of the collision mitigation events. Accordingly, after each new misuse event and/or misuse score logged, or otherwise detected, the method 300 may update and/or recalculate the misuse value associated with the operator/work machine 100.

The system 200 may also perform steps 330 and 335, comparing the misuse value with a misuse threshold and, when the misuse value exceeds the misuse threshold, providing a notification indicative of misuse of the object detection system to the output device 214. The misuse threshold may correspond to the misuse value as discussed above. For example, the misuse threshold may be defined as a predetermined total number of the misuse events, a predetermined number of the misuse events over the time period of the work machine operation, a predetermined average rate of the misuse events per hour, or a predetermined ratio of the misuse events to the total number of the collision mitigation events. Similarly, after each new misuse event and/or misuse score logged, or otherwise detected, the method 300 may update and/or redetermine whether the misuse value exceeds the misuse threshold for the operator/work machine 100. In some embodiments, the method 300 may include sending additionally intrusive, noticeable, audible, or stern notifications in response to the misuse value exceeding a first misuse threshold, exceeding a second higher misuse threshold, exceeding a third higher misuse threshold, or the like. For example, the misuse threshold may be defined at 10 misuse events a week. Upon reaching the $11^{th}$ misuse event, an operator may receive a notification instructing the operator to drive actively and cease overly relying on the object detection system 150. At the $20^{th}$ misuse event, the operator may receive an audible alert such as a recording instructing the operator to actively avoid hazards, to minimize use of the override functionality, etc. At the $30^{th}$ misuse event, a supervisor may be given the option or the system 200 may automatically de-rate the work machine 100 of the operator until the operator completes a training program or the like.

Turning to FIG. 6, an example user interface/GUI 400 of an output device 214 of an object detect misuse prevention system 200 is shown, the example interface including illustrative notifications 410 (in this embodiment, to a supervisor of the operator) indicative of misuse/normal use of an object detection system 150. As shown in FIG. 6, the output device 214 may be a display device, a mobile device, a laptop, tablet, or other device configured to receive data from the system 200 and/or the misuse database 210 thereof. For example, the misuse data collected by the system 200 may be stored based on the time of the misuse event, the operator associated with the event, the work machine associated with the event, and the associated score of the event. Similarly, the misuse database may contain graphs, charts, histograms, statistics, and other data related to the misuse values (e.g., average misuse values of a fleet of work machines, rankings of operators from lowest to highest associated misuse values, etc.).

The GUI 400 may include one or more identifiers 405 associated with the misuse data, one or more graphics 410 (e.g., a table, a chart, a log, etc.) associated with the misuse data, one or more summaries 415 of the misuse data for one or more operators, a prompt 420 to view a more detailed misuse dataset, and/or one or more commands 425 responsive to a predetermined misuse value.

For example, the identifiers 405 may include a report title, a machine number or the like indicative of the work machine 100 associated with the misuse data, a name or identifier of an operator associated with the misuse data, and/or a location at which the misuse data was collected. The one or more graphics 410 (here, an operator log detailing misuse events at certain times on a certain date) may include additional misuse data and identifiers associated with the data. For example, the graphic 410 includes a column of timestamps associated with each detected event, a description of each event (e.g., a list of the parameters, control settings, etc. of the work machine 100 at the time of the collision mitigation event and/or the object detection override event), and a classification and/or score associated with the detected event. For example, the first entry in the log details an event logged at 11:00:00 AM at Worksite A by operator Rodney Danger on Machine No. 123456789. The system 200 detected a collision mitigation event during which the autobrake functionality of the object detection system 150 was activated while Machine No. 123456789 was at full throttle. The system 200 also failed to detect any brake activity, attempts to slow down, or other mitigating action. Accordingly, the GUI 400 indicates that the system 200 classified the event as a misuse event with a score of "High". In contrast, at 11:35:40 AM, the system 200 detected a collision mitigation event wherein an alarm was triggered, and the work machine was manually steered around the obstacle. Accordingly, the GUI 400 indicates that the system 200 classified the event as a normal event (e.g., the operator did not rely on the object detection system 150 and actively operated the work machine to avoid a collision).

Further, the GUI 400 may include summary information 415, such as a current or cumulative misuse value associated with one or more operators, an average current or cumulative misuse value associated with a worksite, etc. As shown in FIG. 4, the operator log indicates that three misuse events occurred within a 30-minute window from 11:00:00 AM-11:30:00 AM. Accordingly, and as an example, the system 200 may calculate that the operator has a misuse value of 6.0 misuse events per hour. The GUI 400 may display an operator's misuse value adjacent to a threshold misuse value and/or an average misuse value. In some embodiments, the GUI 400 may include a prompt 420 to view a more detailed display of the misuse data associated with one or more operators. For example, the detailed report may include a plot charting misuse events over time, listing events by severity, presenting a table with a breakdown of misuse events and their associated scores, or other suitable information.

Finally, the GUI 400 may include one or more commands 425 selectable responsive to a misuse value exceeding a threshold misuse value. For example, as shown in FIG. 6, a supervisor viewing the GUI 400 may choose to send a notification directly to the operator to alert them to avoid misuse of the object detection system 150. Alternatively, the GUI 400 may include an option to review, edit, or annotate misuse data associated with one or more operators. Additionally, the GUI 400 and the system 200 may allow for de-rating of the work machine 100 (e.g., responsive to an operator misusing the object detection system 150, lowering the speed, power, etc. of the work machine 100 to prevent hazardous machine operation.).

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the various embodiments is illustrative only. Additionally, any element disclosed in one embodiment may be incorporated or utilized with any other embodiment disclosed herein.

What is claimed is:

1. A system for preventing misuse of an object detection system of a work machine, the system comprising:
an output device configured to display a notification indicative of misuse of the object detection system;
a controller communicatively coupled to the output device, the controller comprising:
a processing circuit comprising memory communicably coupled to one or more processors, the memory storing instructions that, when executed by the one or more processors, causes the processing circuit to:
detect a collision mitigation event of the work machine, wherein the collision mitigation event comprises at least one of automatically stopping the work machine, activating an automatic braking system of the work machine, activating an automatic object avoidance system of the work machine, activating an automatic motion inhibiting system of the work machine, altering a path of the work machine, or preventing a movement of the work machine;
classify the collision mitigation event as a misuse event;
determine a misuse value associated with a work machine operation based on the misuse event;
compare the misuse value with a misuse threshold; and
when the misuse value exceeds the misuse threshold, provide the notification indicative of misuse of the object detection system to the output device.

2. The system of claim 1, wherein the processing circuit is further configured to:
detect an object detection override event; and
classify the object detection override event as the misuse event based on a duration of the object detection override event or a frequency of the object detection override event.

3. The system of claim 1, wherein the processing circuit is further configured to:
determine whether to classify the collision mitigation event as the misuse event or a normal event based on data from the work machine or the object detection system including at least one of an operator propel command, a number of the collision mitigation events, a time period of the work machine operation, an object detect override status, a machine speed, a machine direction, or a seat direction.

4. The system of claim 3, wherein the processing circuit is further configured to:
assign a misuse score to the misuse event based on the data from the work machine or the object detection system including at least one of the operator propel command, the number of the collision mitigation events, the time period of the work machine operation, the object detect override status, the machine speed, the machine direction, or the seat direction; and wherein:
the operator propel command comprises at least one of a propel handle position, an acceleration pedal position, a deceleration pedal position, or a transmission gear.

5. The system of claim 1, wherein
the misuse value comprises at least one of a total number of the misuse events, a number of the misuse events over a time period of the work machine operation, an average rate of the misuse events per hour, or a ratio of the misuse events to a total number of the collision mitigation events; and
the misuse threshold comprises at least one of a predetermined total number of the misuse events, a predetermined number of the misuse events over the time period of the work machine operation, a predetermined average rate of the misuse events per hour, or a predetermined ratio of the misuse events to the total number of the collision mitigation events.

6. The system of claim 1, wherein:
the output device comprises at least one of a work machine component, a mobile device, or a remote computing system; and
the notification indicative of misuse comprises at least one of an alert to an operator of the work machine, an alert to an observer of the work machine, or an alert to a supervisor of the operator.

7. The system of claim 6, wherein at least one of the alert to the operator, the alert to the observer, or the alert to the supervisor comprises:
an audible alert, a light beacon activation, a notification shown on a display of the work machine, a haptic alert to the work machine component, a signal sent to the remote computing system, a notification sent to the mobile device, or a combination thereof.

8. A method for preventing misuse of an object detection system of a work machine, the method comprising:
detecting, by one or more processors, a collision mitigation event of the work machine, wherein the collision mitigation event comprises at least one of automatically stopping the work machine, activating an automatic braking system of the work machine, activating an automatic object avoidance system of the work machine, activating an automatic motion inhibiting system of the work machine, altering a path of the work machine, or preventing a movement of the work machine;
classifying, by the one or more processors, the collision mitigation event as a misuse event;
determining, by the one or more processors, a misuse value associated with a work machine operation based on the misuse event;
comparing, by the one or more processors, the misuse value with a misuse threshold; and
when the misuse value exceeds the misuse threshold, providing, by the one or more processors, a notification indicative of misuse of the object detection system to an output device.

9. The method of claim 8, further comprising:
detecting, by the one or more processors, an object detection override event; and
classifying, by the one or more processors, the object detection override event as the misuse event based on a duration of the object detection override event or a frequency of the object detection override event.

10. The method of claim 8, wherein classifying the collision mitigation event as the misuse event further comprises:
determining, by the one or more processors, whether the collision mitigation event is the misuse event or a normal event based on data from the work machine or the object detection system including at least one of an operator propel command, a number of the collision mitigation events, a time period of the work machine operation, an object detect override status, a machine speed, a machine direction, or a seat direction.

11. The method of claim 10, further comprising:
assigning a misuse score to the misuse event based on the data from the work machine or the object detection system including at least one of the operator propel command, the number of the collision mitigation events, the time period of the work machine operation, the object detect override status, the machine speed, the machine direction, or the seat direction; and wherein:
the operator propel command comprises at least one of a propel handle position, an acceleration pedal position, a deceleration pedal position, or a transmission gear.

12. The method of claim 8, wherein:
the misuse value comprises at least one of a total number of the misuse events, a number of the misuse events over a time period of the work machine operation, an average rate of the misuse events per hour, or a ratio of the misuse events to a total number of the collision mitigation events; and
the misuse threshold comprises at least one of: a predetermined total number of the misuse events, a predetermined number of the misuse events over the time period of the work machine operation, a predetermined average rate of the misuse events per hour, or a predetermined ratio of the misuse events to the total number of the collision mitigation events.

13. The method of claim 8, wherein:
the output device comprises at least one of a work machine component, a mobile device, or a remote computing system; and
providing, by the one or more processors, the notification indicative of misuse comprises at least one of an alert to an operator of the work machine, an alert to an observer of the work machine, or an alert to a supervisor of the operator.

14. The method of claim 13, wherein at least one of the alert to the operator, the alert to the observer, or the alert to the supervisor comprises:
an audible alert, a light beacon activation, a notification shown on a display of the work machine, a haptic alert to a component of the work machine, a signal sent to the remote computing system, a notification sent to the mobile device, or a combination thereof.

15. A work machine comprising:
an object detection system comprising:
a sensor coupled to the work machine, the sensor configured to detect an obstacle in a path of the work machine,
a controller, the controller configured to cause a collision mitigation event to avoid the obstacle;
an output device configured to display a notification indicative of misuse of the object detection system;
at least one processing circuit comprising at least one memory coupled to at least one processor, the at least one memory storing instructions therein that, when executed by the at least one processor, causes the at least one processor to:
detect the collision mitigation event of the work machine during an operation of the work machine,
classify the collision mitigation event as a misuse event, based on a status of an object detection system of the work machine being indicative of an override during the operation,
determine a misuse value associated with a work machine operation based on the misuse event,
compare the misuse value with a misuse threshold, and
in response to the misuse value exceeding the misuse threshold, provide to the output device the notification indicative of misuse of the object detection system and automatically de-rate the operation of the work machine.

16. The work machine of claim 15, wherein the at least one processor is configured to:
detect an object detection override event; and
classify the object detection override event as the misuse event based on a duration of the object detection override event or a frequency of the object detection override event.

17. The work machine of claim 15, wherein:
the misuse value comprises at least one of a total number of the misuse events, a number of the misuse events over a time period of the work machine operation, an average rate of the misuse events per hour, or a ratio of the misuse events to a total number of the collision mitigation events; and
the misuse threshold comprises at least one of a predetermined total number of the misuse events, a predetermined number of the misuse events over the time period of the work machine operation, a predetermined average rate of the misuse events per hour, or a predetermined ratio of the misuse events to the total number of the collision mitigation events.

18. The work machine of claim 15, wherein:
the output device comprises at least one of a work machine component, a mobile device, or a remote computing system;
the notification indicative of misuse comprises at least one of an alert to an operator of the work machine, an alert to an observer of the work machine, or an alert to a supervisor of the operator; and
wherein at least one of the alert to the operator, the alert to the observer, or the alert to the supervisor comprises an audible alert, a light beacon activation, a notification shown on a display of the work machine, a haptic alert to the work machine component, a signal sent to the remote computing system, a notification sent to the mobile device, or a combination thereof.

\* \* \* \* \*